US012783256B2

(12) United States Patent
Zhao et al.

(10) Patent No.: US 12,783,256 B2
(45) Date of Patent: *Nov. 3, 2026

(54) METHOD AND APPARATUS FOR GENERATING IMAGE FILE AND COMPUTER-READABLE STORAGE MEDIUM

(71) Applicant: TENCENT TECHNOLOGY (SHENZHEN) COMPANY LIMITED, Shenzhen (CN)

(72) Inventors: Xinda Zhao, Shenzhen (CN); Minhua Xu, Shenzhen (CN); Mengchao Shao, Shenzhen (CN); Jinlong Yang, Shenzhen (CN); Haiyang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 247 days.

This patent is subject to a terminal disclaimer.

(21) Appl. No.: 18/643,599

(22) Filed: Apr. 23, 2024

(65) Prior Publication Data

US 2024/0272915 A1 Aug. 15, 2024

Related U.S. Application Data

(63) Continuation of application No. 17/749,911, filed on May 20, 2022, now Pat. No. 11,995,453, which is a (Continued)

(30) Foreign Application Priority Data

Jun. 22, 2020 (CN) ........................ 202010571984.4

(51) Int. Cl.
*G06F 9/44* (2018.01)
*G06F 8/61* (2018.01)
*G06F 9/445* (2018.01)

(52) U.S. Cl.
CPC ............ *G06F 9/44505* (2013.01); *G06F 8/63* (2013.01)

(58) Field of Classification Search
CPC ................................ G06F 8/63; G06F 9/44505
See application file for complete search history.

(56) References Cited

U.S. PATENT DOCUMENTS 9,965,305 B2 5/2018 Zu et al.
10,394,541 B2 * 8/2019 Sugaya .................... G06F 8/63
(Continued)

FOREIGN PATENT DOCUMENTS

CN 104142847 A 11/2014
CN 108984268 A 12/2018
(Continued)

OTHER PUBLICATIONS

The Japan Patent Office (JPO) Notification of Reasons for Refusal for Application No. 2022-555627 and Translation Oct. 31, 2023 6 Pages.
(Continued)

*Primary Examiner* — Qamrun Nahar
(74) *Attorney, Agent, or Firm* — ANOVA LAW GROUP, PLLC

(57) ABSTRACT

Embodiments of the present disclosure disclose a method and apparatus for generating an image file and a computer-readable storage medium. The method includes: receiving an image file generation request, the image file generation request carrying an application installation file; loading a basic image file of an operating system in a preset system area according to the image file generation request, to start
(Continued)

the operating system; installing an application corresponding to the application installation file in the operating system, and running the application to obtain a system dataset after the application is run and attribute information of the application; identifying application data corresponding to the application from the system dataset according to the attribute information of the application; and merging the application data with the basic image file to generate an image file of the application.

20 Claims, 12 Drawing Sheets

Related U.S. Application Data continuation of application No. PCT/CN2021/095410, filed on May 24, 2021.

(56) References Cited

U.S. PATENT DOCUMENTS

| | | | | |
|---|---|---|---|---|
| 2003/0236927 | A1* | 12/2003 | Cleraux | G06F 8/63 719/331 |
| 2011/0225574 | A1 | 9/2011 | Khalidi et al. | |
| 2016/0077855 | A1* | 3/2016 | Zu | G06F 9/45533 718/1 |
| 2018/0189121 | A1 | 7/2018 | Jobi et al. | |
| 2018/0365035 | A1 | 12/2018 | Liu et al. | |
| 2021/0049001 | A1 | 2/2021 | Okada | |
| 2022/0276878 | A1 | 9/2022 | Zhao et al. | |
| 2023/0266955 | A1 | 8/2023 | Li et al. | |

FOREIGN PATENT DOCUMENTS

| | | | |
|---|---|---|---|
| CN | 109391688 | A | 2/2019 |
| CN | 109729121 | A | 5/2019 |
| CN | 111124598 | A | 5/2020 |
| CN | 111596932 | A | 8/2020 |
| JP | 2009187247 | A | 8/2009 |
| WO | 2019181860 | A1 | 9/2019 |

OTHER PUBLICATIONS

China National Intellectual Property Administration (CNIPA) Office Action 1 for 202010571984.4 Dec. 9, 2020 15 Pages (including translation).

The World Intellectual Property Organization (WIPO) International Search Report for PCT/CN2021/095410 Sep. 1, 2021 8 Pages (including translation).

YiLun Li et al., "Research on Image Management Mechanism Based on Application Hierarchical Technology," Computer Applications and Software, vol. 35 Issue 2, Feb. 28, 2018, p. 22-25. 8 pages.

Rory Monagham, "Guide to creating one Golden Image for Windows 10," Algiz Technology, May 25, 2017, Retrieved from the Internet: URL: https://www.algiz-technology-com/golden-image-best-practices, [retrieved on May 20, 2022] 10 pages.

* cited by examiner

METHOD AND APPARATUS FOR GENERATING IMAGE FILE AND COMPUTER-READABLE STORAGE MEDIUM

CROSS-REFERENCES TO RELATED APPLICATIONS

This application is a continuation of U.S. application Ser. No. 17/749,911 filed on May 20, 2022; U.S. application Ser. No. 17/749,911 is a continuation application of PCT Patent Application No. PCT/CN2021/095410, entitled “METHOD AND APPARATUS FOR GENERATING MIRROR IMAGE FILE, AND COMPUTER-READABLE STORAGE MEDIUM” and filed on May 24, 2021, which claims priority to Chinese Patent Application No. 202010571984.4, entitled “METHOD AND APPARATUS FOR GENERATING IMAGE FILE AND COMPUTER-READABLE STORAGE MEDIUM, PRC on Jun. 22, 2020, the entire contents of all of which are incorporated herein by reference.

FIELD OF THE TECHNOLOGY

The present disclosure relates to the field of communication technologies, and in particular, to a method and apparatus for generating an image file and a computer-readable storage medium.

BACKGROUND OF THE DISCLOSURE

In recent years, with the rapid development of a cloud technology, increasing applications allow cloud-start. During deployment of an application by using the cloud technology, an image file including the application is required to be acquired. By loading the image file, the application can be deployed. Therefore, the image file of the application is required to be made or generated in advance. In an existing image file generation method, an operating system is usually started by loading a basic image file, then an application is directly installed or updated on the operating system, and a system dataset after the application is installed or updated is directly stored as an image file of the application.

However, when the system dataset is directly stored as the image file of the application, since the image file of the application includes some data irrelevant to the application or some temporary data, a large memory is required for the image file, resulting in large storage resource occupation. In addition, because a device needs to additionally read and process the data irrelevant to the application or the temporary data during deployment of the application, many processing resources of the device are occupied, and a deployment time of the application is greatly prolonged.

SUMMARY

Embodiments of the present disclosure provide a method and apparatus for generating an image file and a computer-readable storage medium. In this way, storage resources can be saved, processing resources of a device where an application is disposed are saved, and a deployment time of the application is reduced.

In some embodiments, a method for generating an image file includes: receiving an image file generation request, the image file generation request carrying an application installation file; loading a basic image file of an operating system in a preset system area according to the image file generation request, to start the operating system; installing an application corresponding to the application installation file in the operating system, and running the application to obtain a system dataset after the application is run and attribute information of the application; identifying application data corresponding to the application from the system dataset according to the attribute information of the application; and merging the application data with the basic image file to generate an image file of the application.

In some embodiments, an apparatus for generating an image file includes: a receiving unit, configured to receive an image file generation request, the image file generation request carrying an application installation file; a starting unit, configured to load a basic image file of an operating system in a preset system area according to the image file generation request, to start the operating system; a running unit, configured to install an application corresponding to the application installation file in the operating system, and run the application to obtain a system dataset after the application is run and attribute information of the application; a screening unit, configured to identify application data corresponding to the application from the system dataset according to the attribute information of the application; and a generation unit, configured to merge the application data with the basic image file to generate an image file of the application.

In addition, the embodiments of the present disclosure further provide an electronic device. The electronic device includes a processor and a memory. The memory stores a plurality of program instructions. The processor is configured to run the program instructions in the memory to perform the method for generating an image file provided in the embodiments of the present disclosure.

In addition, the embodiments of the present disclosure further provide a non-transitory computer-readable storage medium storing a plurality of instructions. The instructions are adapted to be loaded by a processor to perform the steps in any of the methods for generating an image file provided in the embodiments of the present disclosure.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure.

Embodiments of the present disclosure provide a method and apparatus for generating an image file and a computer-readable storage medium. The apparatus for generating an image file may be integrated in an electronic device. The electronic device may be a server, or may be a device such as a terminal.

The image file is a single file made of a series of particular files in a specific format for download and use by a user. For example, the image file may be a stored file obtained by means of file storage such as mirroring. In a cloud application, a user may directly open and run an application by using an image file of the application without a need to construct a running environment by using hardware and then install the application. Therefore, deployment of the application can be greatly accelerated, and a hardware configuration required for running the application can be reduced.

The server may be an independent physical server, a server cluster formed by a plurality of physical servers, a distributed system, or a cloud server that provides basic cloud computing services such as a cloud service, a cloud database, cloud computing, a cloud function, cloud storage, a network service, cloud communication, a middleware service, a domain name service, a security service, a network acceleration service, big data, and an artificial intelligence platform. The terminal may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in the present disclosure.

Figure 1:
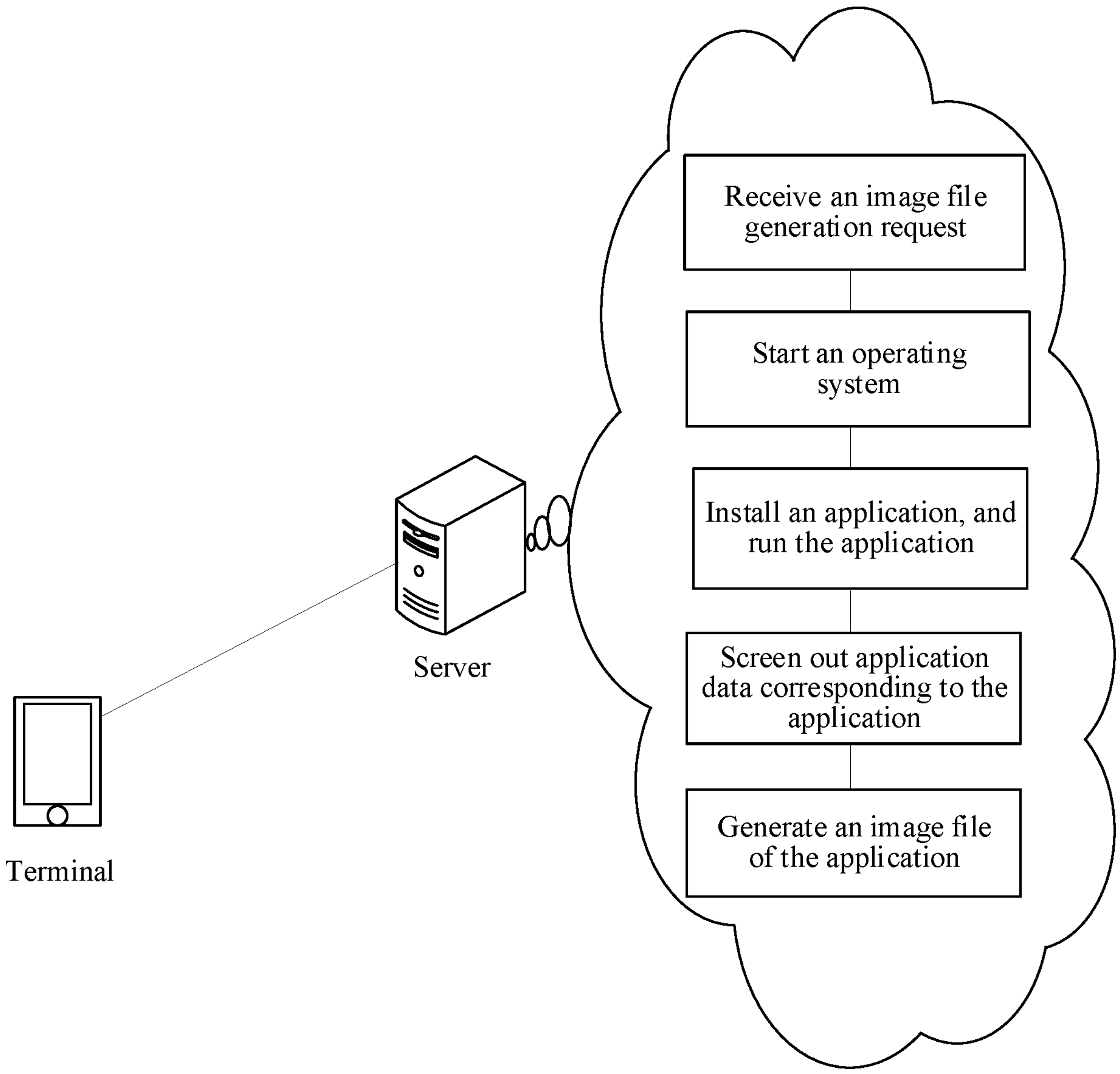
FIG. 1 is a schematic diagram of a scenario of a method for generating an image file according to an embodiment of the present disclosure.

For example, referring to FIG. 1, the apparatus for generating an image file is integrated in the electronic device. The electronic device receives an image file generation request, the image file generation request carrying an application installation file, then loads a basic image file of an operating system in a preset system area according to the image file generation request, to start the operating system, then installs an application corresponding to the application installation file in the operating system and runs the application to obtain a system dataset after the application is run and attribute information of the application, identifies/obtains application data corresponding to the application from the system dataset according to the attribute information of the application, and merges application data with the basic image file to generate an image file of the application.

The preset system area may be a system container in a cloud platform. The cloud platform may alternatively be referred to as a cloud computing platform, and is configured to provide computing, networking and storage capabilities based on services of hardware resources and software resources. Cloud computing is a computing mode, in which computing tasks are distributed on a resource pool formed by a large quantity of computers, so that various application systems can obtain computing power, storage space, and information services according to requirements. A network that provides resources is referred to as a “cloud”. For a user, resources in a “cloud” seem to be infinitely expandable, and can be obtained readily, used on demand, expanded readily, and paid according to usage.

As a basic capability provider of cloud computing, a cloud computing resource pool (referred to as cloud platform for short, generally called Infrastructure as a Service (IaaS)) will be established. Various types of virtual resources are deployed in the resource pool for external customers to choose and use. The cloud computing resource pool mainly includes: a computing device (a virtualized machine including an operating system), a storage device, and a network device.

According to the division of logical functions, a Platform as a Service (PaaS) layer may be deployed on the IaaS player, and the Software as a Service (SaaS) layer may be deployed on the PaaS layer, or the SaaS layer may be directly deployed on the IaaS player. PaaS is a platform on which software runs, such as a database and a web container. SaaS is a variety of business software, such as a web portal and an SMS group sender. Generally, SaaS and PaaS are upper layers relative to IaaS.

The embodiments of the present disclosure are described in detail in the following separately. The description sequence of the following embodiments is not intended to limit preference orders of the embodiments.

This embodiment is described from a point of view of the apparatus for generating an image file. The apparatus for generating an image file may specifically be integrated in the electronic device. The electronic device may be a server, or may be a device such as a terminal. The terminal may include a tablet computer, a notebook computer, a personal computer (PC), a wearable device, a virtual reality device, or other smart devices that can generate image files.

Figure 2:
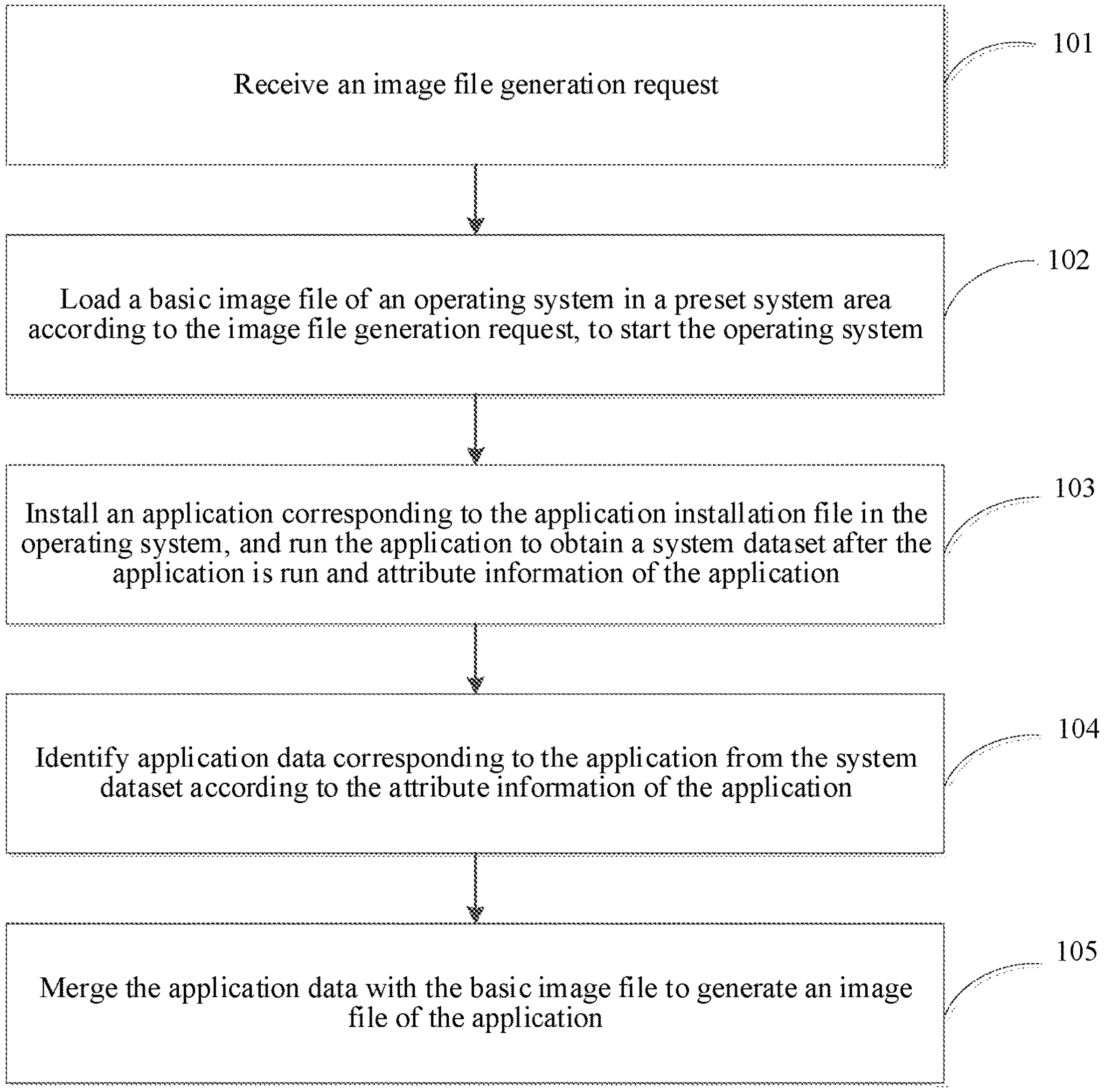
FIG. 2 is a schematic flowchart of a method for generating an image file according to an embodiment of the present disclosure.

An embodiment of the present disclosure provides a method for generating an image file. The method is performed by the electronic device. As shown in FIG. 2, a specific process of the method for generating an image file includes the following steps 101 to 105.

Step 101: Receive an image file generation request.

The image file generation request carries an application installation file. The application installation file may be an installation file required for installing an application. The installation file may include a compiled code file, a resource file, a certificate file, and the like. A format of the application installation file may vary according to an operating system. For example, for an Android operating system, the application installation file may be an Android application package (APK), that is, an APK file.

In this embodiment, the image file generation request may be directly received. For example, the terminal may directly add the application installation file to the image file generation request, and then transmit the image file generation request to which the application installation file is added to the apparatus for generating an image file. The apparatus for generating an image file directly receives the image file generation request, and extracts the application installation file from the image file generation request. When the application installation file requires a relatively large memory or there are a plurality of application installation files, the application installation file(s) may be acquired indirectly. For example, the terminal may store the application installation file in a third party database, then add a storage address to the image file generation request, and transmit the image file generation request to which the storage address is added to the apparatus for generating an image file. The apparatus for generating an image file extracts the storage address from the image file generation request, then acquires the application installation file from the third party database according to the storage address, and may transmit prompt information to the terminal after the application installation file is acquired to prompt the terminal.

Step 102: Load a basic image file of an operating system in a preset system area according to the image file generation request, to start the operating system.

The operating system may be an operating system that runs in the preset system area. The preset system area may be a system container running by using an isolation mechanism in a hardware-supported physical operating system. In some embodiments, the container can be understood as a virtualization of an operating system. For example, a container running the Android operating system may be referred to as an Android container. Each server or cloud server may include a plurality of Android containers. A plurality of operating systems may be run in the system container. The plurality of operating systems run in the system container may remain independent of each other. In some embodiments, through the isolation mechanism (e.g., namespace), the plurality of operating systems can share the same kernel in kernel mode, and remain independent of each other in user mode.

In some embodiments, multiple Android containers can be run on a general operating system (e.g., Linux) at the same time. A device where the general operating system is run can be referred to as a host. An operation performed on the general operating system is referred to as a host operation.

In could gaming, an Android container executes the game application on a server, and game images are transmitted as a video stream to a remote user terminal for processing. Multiple Android containers can be executed on the same server (e.g., an edge server with ARM/x86 architecture).

The basic image file may be an image file including only the operating system. Therefore, the operating system may be started by loading the image file.

In this embodiment, for example, the operating system is the Android operating system. When the image file generation request is received, an Android basic image file of the Android operating system is loaded in the Android container. In this case, the Android operating system can be started in the Android container.

Step 103: Install an application corresponding to the application installation file in the operating system, and run the application to obtain a system dataset after the application is run and attribute information of the application.

For example, the application installation file is run in the operating system, and the application corresponding to the application installation file is installed in the operating system. For example, the application installation file is an APK file of an application A. The APK file is run in the Android operating system by means of a manual command or script installation, so as to install the application A to the Android operating system. The application is run in the operating system, to obtain a system dataset after the application is run and attribute information of the application. For example, the installed application is run in the Android operating system. In this case, all data in the Android container is stored to obtain the system dataset, and the attribute information of the application is acquired in the Android operating system. The attribute information may be information such as a name, a type, an installation address, a memory, and a data list of the application.

In this embodiment, before the application is run to obtain the system dataset and the attribute information of the application, the installed application may be configured. That is to say, before the step of running the application to obtain the system dataset after the application is run and the attribute information of the application, the method for generating an image file may further include: searching the application installation file for configuration information used for configuring the application; configuring the application according to the configuration information when the configuration information exists; and running the configured application on the operating system after the configuration, to obtain a system dataset after the configured application is run and attribute information of the application. Details may be as follows:

(1) Searching the application installation file for the configuration information used for configuring the application.

The configuration information may include data update information and/or preset parameter information. The data update information may be information for updating part or all of resource data in the application. For example, in a cloud game, the resource data may be resource data such as maps or scenarios required to be loaded in the game. The data update information may be updated resource data, or may be a storage address of the updated resource data. The updated resource data is acquired according to the storage address, and then original resource data is updated in the cloud game application. The preset parameter information may be some operations or set parameters preset by the user using the terminal. For example, the application is the cloud game. The preset parameter information may be picture frame numbers, common game operation parameters, and/or other parameter information preset by the user using the terminal.

In this embodiment, a file name or a file format of the data update information or the preset parameter information may be used as a search condition, and the application installation file is searched to determine whether the configuration information used for configuring the application exists therein.

(2) Configuring the application according to the configuration information when the configuration information exists.

For example, when the configuration information exists, the application is configured according to details of the existing configuration information. In this embodiment, when the configuration information is the data update information, built-in data corresponding to the data update information in the application is updated. For example, when the data update information is updated data, the application is searched for the built-in data corresponding to the updated data, and the built-in data is directly replaced with the updated data. A specific updating process may be triggered by manual click/tap or artificial intelligence automatic identification. When the data update information is a storage address of the updated data, the updated data may be acquired according to the storage address. Then, the application is searched for the built-in data corresponding to the updated data, and the built-in data is replaced with the updated data. In another embodiment, when the configuration information is the preset parameter information, a parameter corresponding to the preset parameter information in the application is set. For example, the preset parameter information is a preset picture frame number. A picture frame number in the application is directly set to the preset picture frame number in a frame setting of the application. In another example, when the configuration information is the data update information and the preset parameter information, the built-in data corresponding to the data update information in the application is updated, and the parameter corresponding to the preset parameter information in the updated application is set. For example, when the data update information and the preset parameter information both exist in the configuration information, it may be first determined whether the updated data is included in the data update information. If the updated data is included, the built-in data corresponding to the updated data may be directly replaced in the application, to obtain the updated application. If the data update information includes only the storage address, the updated data is first acquired according to the storage address. Then the built-in data corresponding to the updated data is replaced to obtain the updated application. The parameter corresponding to the preset parameter information is set in the updated application.

Figure 3:
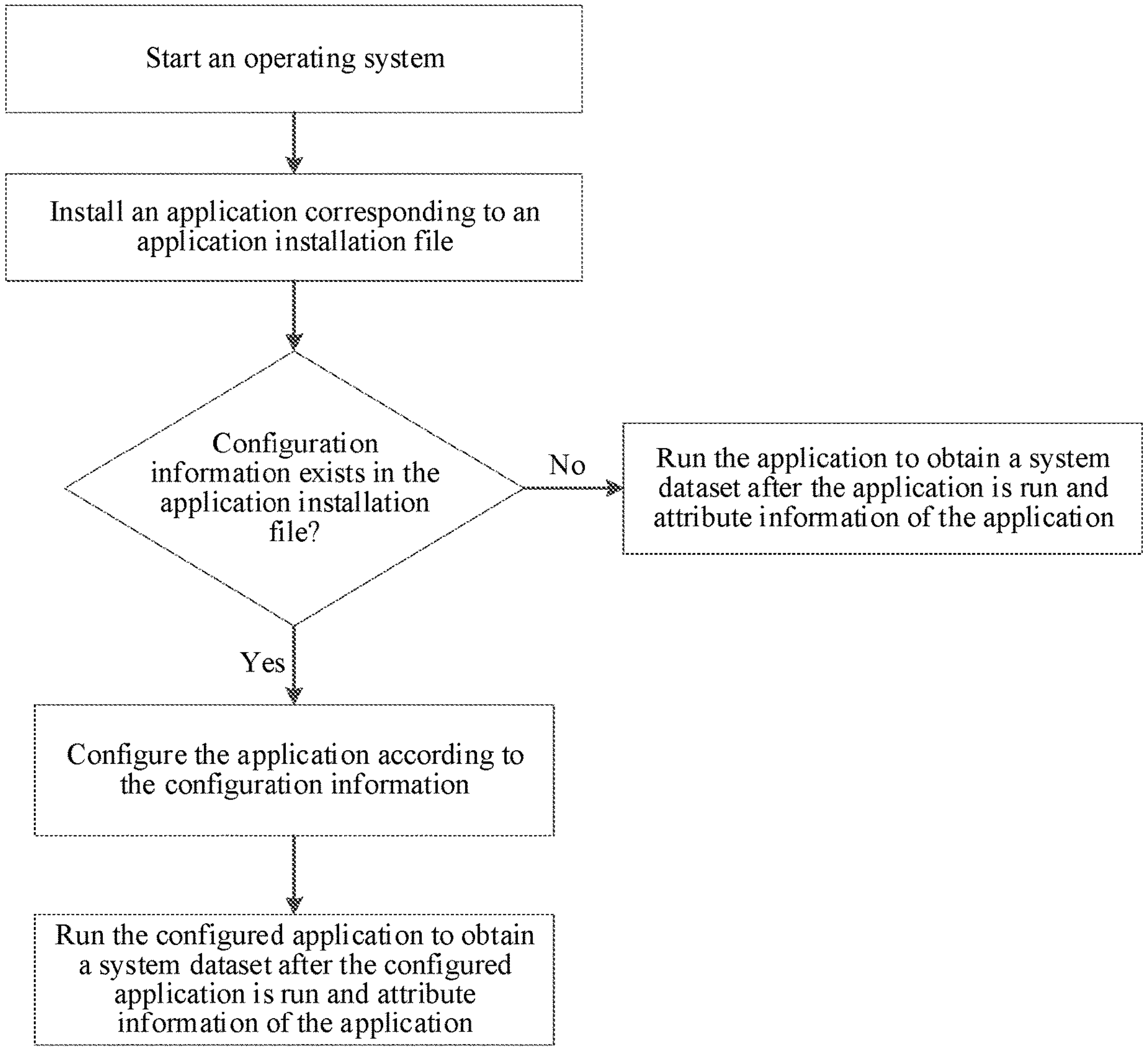
FIG. 3 is a schematic flowchart of installing and running an application according to an embodiment of the present disclosure.

In this embodiment, the application is required to be configured only when the configuration information exists. After the configuration is completed, the configured application is run, to obtain the system dataset after the configured application is run and the attribute information of the application. If the configuration information does not exist, the application may be directly run after the application is installed, to obtain the system dataset after the application is run and the attribute information of the application. A specific process of installing and running the application to obtain the system dataset and the attribute information of the application may be shown in FIG. 3.

Step 104: Identify application data corresponding to the application from the system dataset according to the attribute information of the application.

The application data may be data related to the application, for example, data that supports the running of the application. For example, the application is a cloud game XX, and the application data may be game data in the cloud game XX.

In this embodiment, the identifying application data corresponding to the application from the system dataset according to the attribute information of the application may specifically include steps S1 to S2.

Step S1: Traversing the system dataset according to the attribute information of the application, to obtain initial application data after the application is installed.

Figure 4:
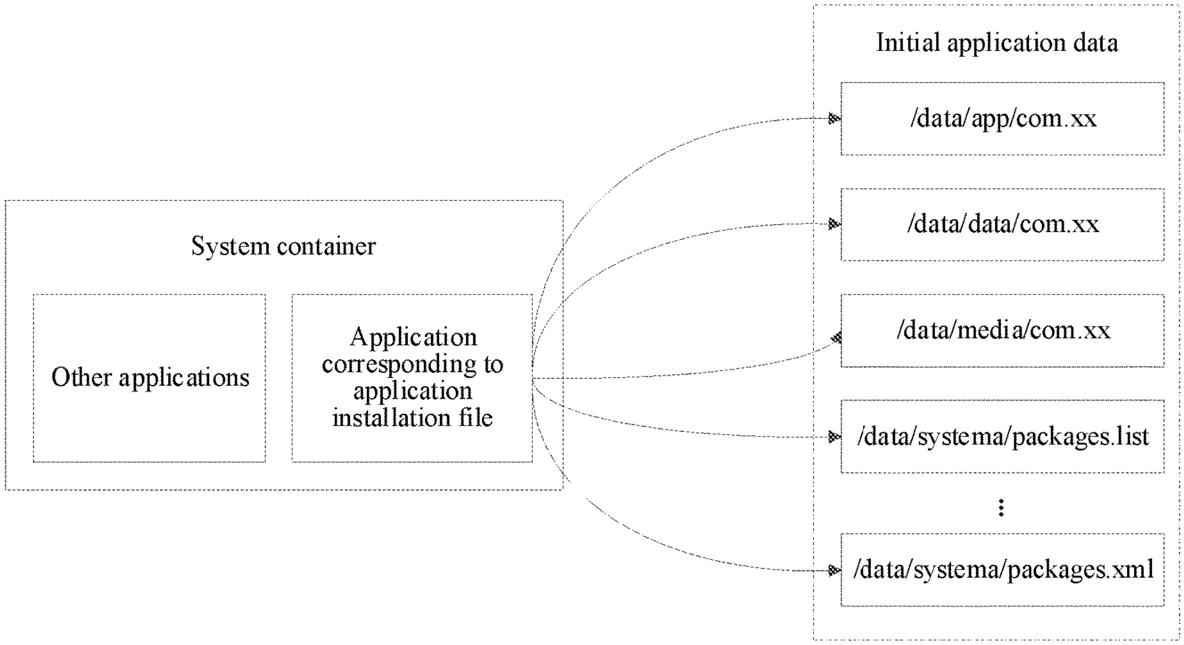
FIG. 4 is a schematic diagram of identifying initial application data according to an embodiment of the present disclosure.

In this embodiment, step S1 may include: acquiring a global directory of the system dataset. For example, the global directory in the system container is acquired, and is used as a global directory of the system dataset. Step S1 may further include: identifying a target directory from the global directory according to the attribute information of the application. For example, directories corresponding to the attribute information, such as file directories corresponding to a name of the application are identified from the global directory according to the attribute information of the application. The directories are used as the target directory. Step S1 may further include: identifying, based on the target directory, the initial application data after the application is installed from the system dataset, to obtain an initial application dataset. For example, candidate system data corresponding to the target directory may be identified from the system dataset, the initial application data corresponding to the application is identified in the candidate system data, as shown in FIG. 4, and the initial application data is stored in the initial application dataset.

Step S2: Adjust the initial application data to obtain the application data corresponding to the application.

Figure 5:
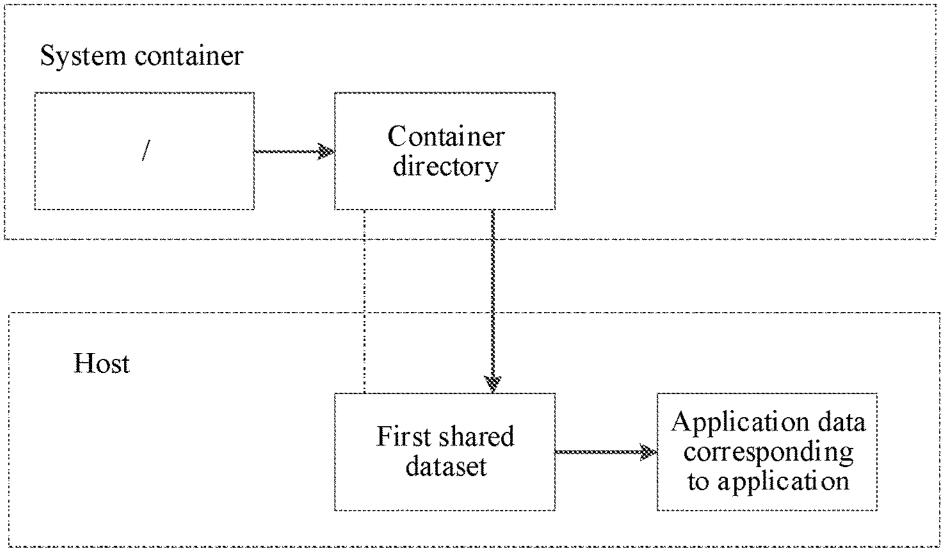
FIG. 5 is a schematic diagram of adjusting the initial application data according to an embodiment of the present disclosure.

In this embodiment, a first shared dataset may be constructed in an area outside the operating system, to cause the first shared dataset to share the initial application data with the initial application dataset. For example, a previous directory (for example, /home/workin) of a host may be mounted to a container directory (for example, /workin) of the system container. Data corresponding to the container directory may be the initial application dataset. Therefore, data corresponding to the previous directory of the host may be the first shared dataset. In this way, the first shared dataset can share the initial application data with the initial application dataset. In this embodiment, the initial application data in the first shared dataset is adjusted to obtain the application data corresponding to the application, as shown in FIG. 5. In this embodiment, abnormal data and configuration data may be identified in the application data according to a first preset identification condition. The initial application data may alternatively be transferred and modified by using an abd command or in other manners. In this embodiment, the abnormal data in the initial application dataset may alternatively be deleted from the first shared dataset, and the configuration data in the initial application dataset is modified. For example, the abnormal data in the initial application dataset may be deleted. The abnormal data may include partial temporary data during the running of the application and data irrelevant to the application. The temporary data required to be deleted may be related files under directories such as "/mnt/runtime/read", "/mnt/runtime/write", and "/storage/emulated". In another example, a name of a data package may be used as a search condition. For example, the name of the data package may be "com.tenxxx.tmgp.sgame". The entire configuration data is searched for target configuration data. The target configuration data may be data such as related fields in files such as "/data/system/packages.xml" and "/data/system/packages.list". The target configuration data is retained, and other configuration data is modified or deleted. The operation is mainly intended to minimize application-related data to reduce coupling with the basic image file. In this embodiment, icon display of some applications in an Android desktop system may be further modified. For example, during generation of the image file, some icons are required to be displayed for click/tap by a user. After the generation is completed, the icons (for example, icons of applications such as QQ and WeChat) are required to be hidden. Therefore, corresponding configuration files are required to be modified to adjust states of the corresponding icons. Application data corresponding to the applications may be obtained by deleting and modifying configuration data.

In this embodiment of the present disclosure, during the deletion and the modification of the initial application data, an attribute and a permission of the file are required to remain unchanged.

Step 105: Merge the application data with the basic image file to generate an image file of the application.

The basic image file includes at least one read-only layer. As the term suggests, the read-only layer only allows reading of data thereon but not modification of the data. A read-write layer may be added to the basic image file. A biggest difference of the read-write layer from the read-only layer is that data in the read-write layer can be both read and modified.

Figure 6:
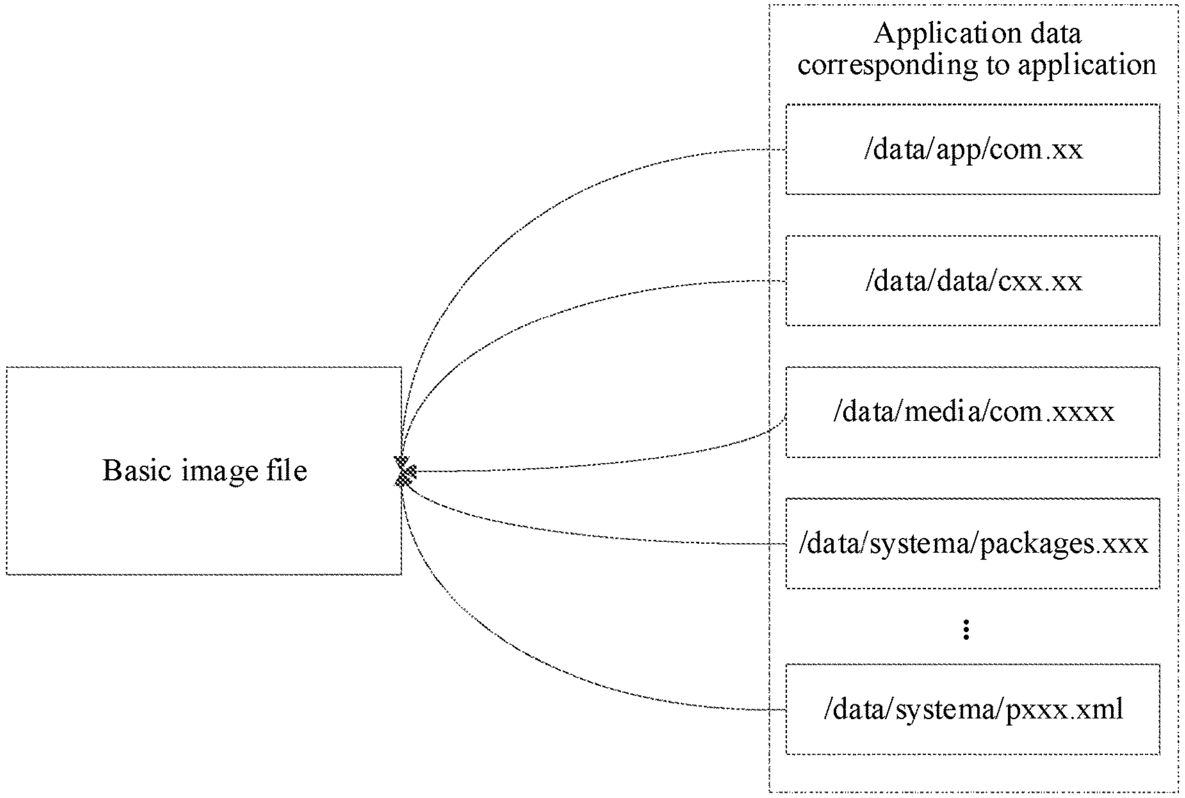
FIG. 6 is a schematic diagram of generating an image file of an application according to an embodiment of the present disclosure.

In this embodiment, basic information of the read-write layer required to be added to the basic image file may be determined according to the application data. For example, basic information such as a read-write layer capacity (or file quantity), a read-write layer memory, a read-write layer position, and a read-write layer type may be determined according to a data size and a data type of the application data. The read-write layer corresponding to the basic information is added to the read-only layer of the basic image file. For example, a read-write layer corresponding to the read-write layer type, quantity, and memory are added to a specific position on the read-only layer of the basic image file. The application data is added to the read-write layer according to the basic information, to obtain the image file of the application, as shown in FIG. 6. In this embodiment, a process of adding the application data to the read-write layer according to the basic information, to obtain the image file of the application may include: acquiring the attribute information of the application data; identifying, from the read-write layer according to the basic information of the read-write layer, a read-write layer matching the attribute information of the application data as a target read-write layer; and adding the application data to the target read-write layer, and using the basic image file to which the application data is added as the image file of the application. For example, Dockerfile (which is a text file used for constructing the image file) may be used to construct the image file of the application. A specific solution may be as follows:

A Dockerfile text is created. The text includes a command and an instruction required for constructing the image file. For example, a specific basic image text is designated. In this embodiment, the basic image text may be designated as a basic image file of an Android operating system, and the application data corresponding to the application is added to the Android basic image file by using a COPY or ADD command. By virtue of the file, an image file of the application having a designated name can be generated. In this process, an attribute and a permission of the file are required to remain unchanged. In this embodiment, the basic image file may be merged with the application data in other manners, to obtain the image file of the application.

In this embodiment, the image file of the application may alternatively be synthesized by using commands such as "docker run/docker cp/docker export", to obtain the image file of the application.

In this embodiment, after the image file of the application is deployed on a server where the image file is run, in case of upgrading some components of the operating system, modifying an input method, and repairing vulnerabilities during running, the basic image file is required to be updated. In this case, the image file of the application is also required to be updated. Therefore, the method for generating an image file may further include:

acquiring an updated basic image file when the basic image file is updated; adding a read-write layer to a read-only layer of the updated basic image file; and adding the application data corresponding to the application to the read-write layer, to obtain a first updated image file of the application.

In this embodiment, when the basic image file is updated, the updated basic image file is acquired, basic information of the read-write layer to be added to the basic image file is determined according to the application data, the read-write layer corresponding to the basic information is added to the read-only layer of the updated basic image file, and the application data is added to the read-write layer according to the basic information, to obtain the first updated image file of the application.

In this embodiment, when the basic image file is updated, the updated basic image file may be further reloaded, the application is re-installed or re-updated in the system container to obtain candidate application data of the application, and the updated basic image file and the application data are merged to obtain the first updated image file of the application. By merging the updated basic image file and the application data of the application obtained previously, the generation of the first updated image file of the application can be accelerated.

In this embodiment, after the image file of the application is deployed on the server where the image file is run, when the application is updated, which means that the installation file of the application is also updated, the application is required to be updated. Therefore, the method for generating an image file may further include:

acquiring an updated application installation file when the application installation file is updated; updating the application on the operating system according to the updated application installation file, and monitoring the application data corresponding to the application; extracting updated application data as updated data of the application when the application data is updated; and merging the updated data with the image file of the application to obtain a second updated image file after the application is updated.

Figure 7:
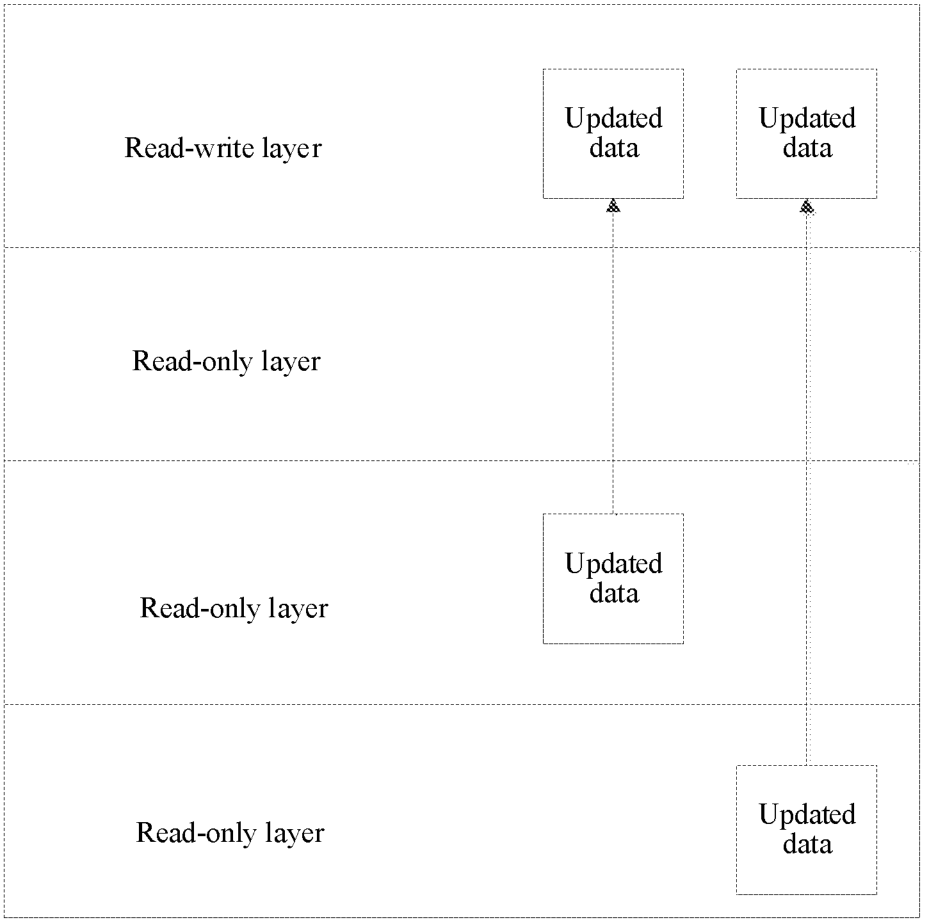
FIG. 7 is a schematic diagram of an image file after a read-write layer is superimposed according to an embodiment of the present disclosure.

In this embodiment, the updated application installation file may be acquired when the application installation file is updated. For example, the updated application installation file may be directly acquired. Alternatively, a storage address of the updated application installation file may be acquired, and then the updated application installation file is acquired according to the storage address. In this embodiment, the image file of the application may be loaded on the operating system, and the read-write layer is added to the image file of the application. For example, the image file of the application is loaded on the operating system of the system container. The image file loaded in the system container may be defined as a read-only layer. The system container may include one or more read-only layers, and one read-write layer is superimposed on the one or more read-only layers. In this case, the image file in the system container can be modified. If a same file exists in the read-only layer of the image file, the file in the read-only layer of the image file is copied to the read-write layer of the image file, and then the copied file is modified. In this way, only the file in the read-write layer is modified and the file in the read-only layer is not modified, as shown in FIG. 7. In this case, changes or modifications to the image file of the application can be dynamically recorded. In this embodiment, the application is updated on the operating system according to the updated application installation file, and the application data corresponding to the application is monitored by using the read-write layer during the updating of the application. For example, the application may be updated merely by loading the updated application installation file on the operating system. During the updating, an image home directory of the host may be mounted to the system container as an image file directory. The image home directory of the host may include the image file of the application. During the updating of the application, data in the image file of the application is modified in the read-write layer. Therefore, as long as the read-write layer of the image file of the application changes, it may be determined that the application data corresponding to the application is updated. Therefore, the monitoring of the application data corresponding to the application may be completed in the read-write layer, which may be understood as monitoring the updating of the application data corresponding to the application using the read-write layer. Alternatively, a file monitoring program may be customized in the system container for monitoring the updating of the application data.

Figure 8:
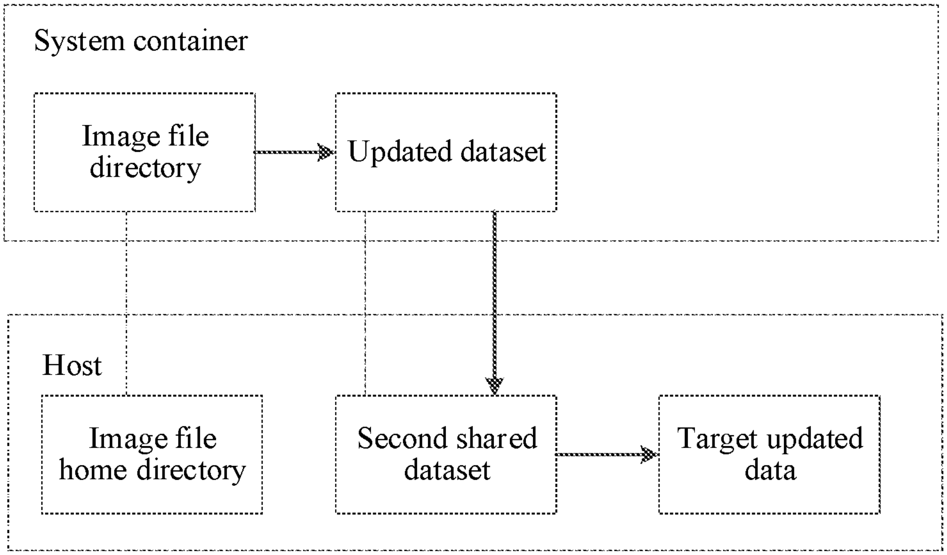
FIG. 8 is a schematic diagram of adjusting updated data according to an embodiment of the present disclosure.

In this embodiment, when the application data is updated, the updated application data may be extracted. For example, after the updating of the application is completed, it is determined that the read-write layer changes. In this case, it may be determined that the application is updated. Then an updated dataset is created in the system container, and a script file under an updated dataset directory is executed. Then the updated data may be acquired merely by traversing a read-write layer directory of the image file of the application under the image file directory, and the updated data is stored in the updated dataset. In this embodiment, a second shared dataset may be constructed in an area outside the system container where the operating system is located, to cause the second shared dataset to share data content of the updated data with the updated dataset. For example, the second shared dataset may be constructed in the area outside the system container of the operating system, so that the second shared dataset can share the data content of the updated data with the updated dataset. In this embodiment, abnormal data and configuration data in the updated data may be identified in the second shared dataset according to a second preset identification condition. For example, the updated data in the second shared dataset is analyzed, so that the abnormal data and the configuration data in the updated data can be identified. The abnormal data in the updated data is deleted from the second shared dataset, and the configuration data in the updated data is modified, to obtain target updated data. For example, the abnormal data may be some temporary data generated during the running of the application and data irrelevant to the application. The temporary data and the data irrelevant to the application may be deleted. The temporary data required to be deleted may be related files under directories such as "/mnt/runtime/read", "/mnt/runtime/write", and "/storage/emulated". In this embodiment, a name of a data package may be used as a search condition. For example, the name of the data package may be "com.tenxxx.tmgp.sgame". The entire configuration data is searched for target configuration data. The target configuration data may be data such as related fields in files such as "/data/system/packages.xml" and "/data/system/packages.list". The target configuration data is retained, and other configuration data is modified or deleted. In this embodiment, configuration data in some updated applications may be further modified. For example, during generation of the image file, some icons are required to be displayed for click/tap by a user. After the generation is completed, the icons (for example, icons of applications such as QQ and WeChat) are required to be hidden. Therefore, corresponding configuration files are required to be modified to adjust states of the corresponding icons. The target updated data may be obtained by deleting or modifying configuration data, as shown in FIG. 8. The target updated data is merged with the image file of the application to obtain the second updated image file after the application is updated. In this embodiment, the information of the read-write layer required to be added to the image file may be determined according to the target updated data. The read-write layer is superimposed on the image file. Then a target updated data is added to the read-write layer of the image file. In this way, the second updated image file after the application is updated can be obtained. A specific process of merging the target updated data with the image file of the application may be constructed by using Dockerfile. For example, a Dockerfile text is created. The text includes a command and an instruction required for constructing the second updated image file. For example, a specific basic image text is designated. In this embodiment, the basic image text may be designated as the image file of the application, and the target updated data is added to the image file of the application by using a COPY or ADD command. By virtue of the file, an image file of the application having a designated name can be generated. In this process, an attribute and a permission of the file are required to remain unchanged. In this embodiment, the image file of the application may alternatively be merged with the target updated data in other manners, to obtain the second updated image file after the application is updated.

When the application installation file is updated, it may be understood that the application is required to be updated. In order to update the application, the basic image file may be loaded to start the operating system, the updated application installation file is re-installed in the operating system, then the application data of the updated application is acquired, and the application data is merged with the basic image file to obtain the second updated image file of the application. However, in order to reduce a deployment time of the application, the updated data in the application data may be acquired, and the updated data is merged with the image file of the application to obtain the second updated image file of the application.

In this embodiment, the image file, the first updated image file, and the second updated image file of the application may alternatively be stored by using a blockchain. A blockchain is a new application mode including computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block.

The blockchain may include an underlying blockchain platform, a platform product service layer, and application service layer. The blockchain underlying platform may include processing modules such as a user management module, a basic service module, an intelligent contract module, and an operation supervision module. A user management module is responsible for management of identity information of all blockchain participants, including maintenance of public and private key generation (account management), key management, maintenance of a corresponding relationship between a real identity of a user and a blockchain address (authority management), and so on, and in a case of being authorized, supervises and audits transaction states of some real identities, and provides rule configuration for risk control (risk control audit). The basic service module is deployed on all node devices of the blockchain to verify validity of a service request and record a valid request to a storage after achieving a consensus on the valid request. For a new service request, the basic service module first performs adaptation analysis and authentication (interface adaptation) on an interface, and then encrypts (consensus management) service information by using a consensus algorithm, encrypts and then transmits the whole service information to a shared ledger (network communication), and records and stores the service information. A smart contract module is responsible for registration and issuance of a contract, as well as contract triggering and contract execution. A developer may define contract logic through a programming language, publish the contract logic to the blockchain (contract registration), according to logic of a contract term, call a key or other events to trigger execution, complete the contract logic, and further provide functions of contract upgrade and cancellation. An operation monitoring module is mainly responsible for deployment, configuration modification, contract configuration, cloud adaptation and visual output of a real-time state of a product during product operation, for example: alarming, monitoring a network condition, monitoring node device health state, and so on.

The platform product service layer provides basic capabilities and an implementation framework of a typical application. Based on these basic capabilities, developers may superpose characteristics of services and complete blockchain implementation of service logic. The application service layer provides a blockchain solution-based application service for use by a service participant.

According to the method described in the foregoing embodiments, the following further provides detailed description for the embodiments of the present disclosure.

In this embodiment, for example, the apparatus for generating an image file is integrated on the electronic device, the electronic device is a server, and the preset system area is a system container.

Figure 9:
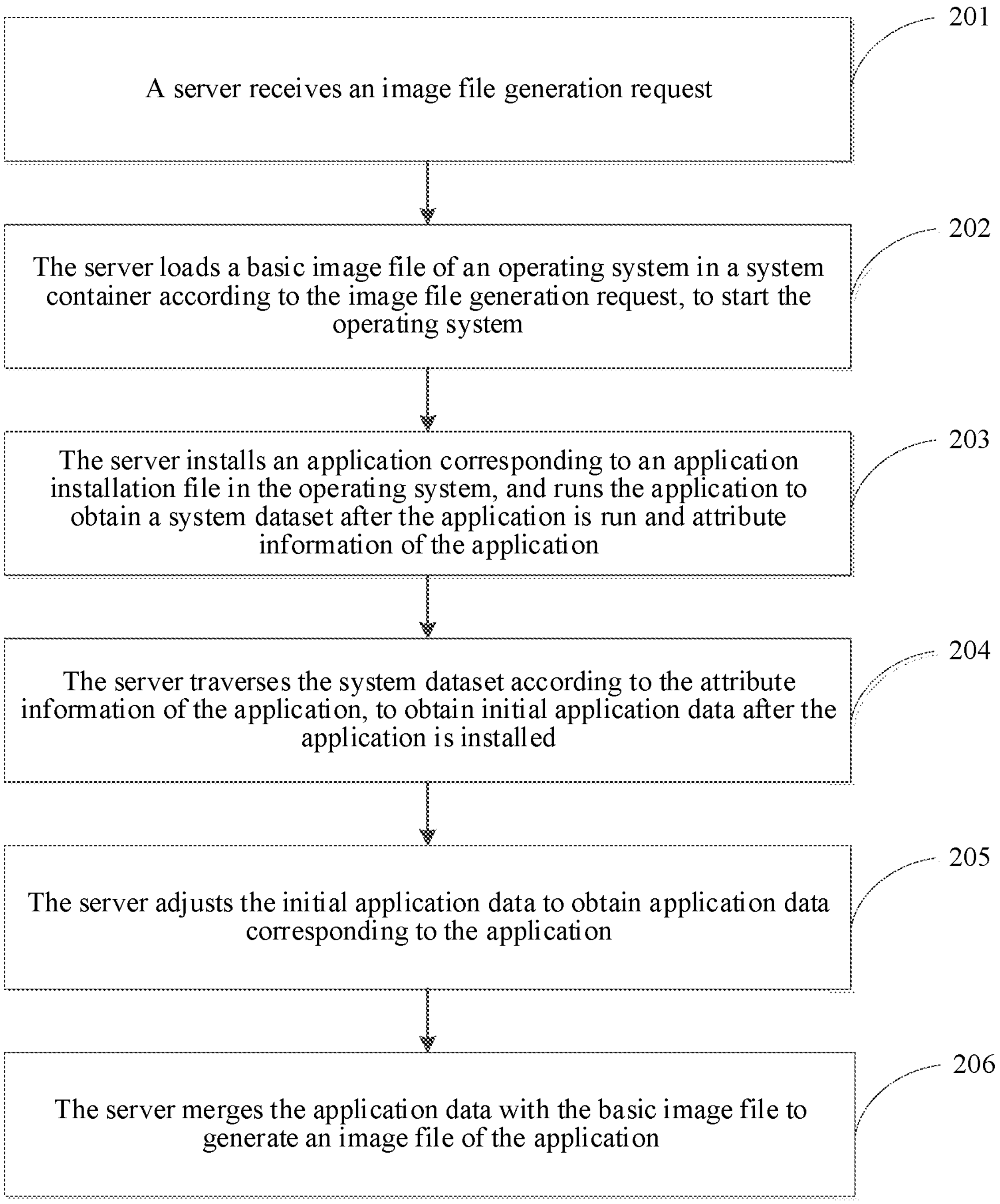
FIG. 9 is another schematic flowchart of a method for generating an image file according to an embodiment of the present disclosure.

As shown in FIG. 9, a specific process of the method for generating an image file includes the following steps 201 to 206.

Step 201: The server receives an image file generation request.

In this embodiment, a terminal may directly add an application installation file to the image file generation request, and then transmit the image file generation request to which the application installation file is added to the server. The server may receive the image file generation request, and acquire the application installation file from the image file generation request. When the application installation file requires a relatively large memory, the terminal may store the application installation file in a third party database, then add a storage address to the image file generation request, and transmit the image file generation request added to which the storage address is added to the server. The server extracts the storage address from the image file generation request, then acquires the application installation file from the third party database according to the storage address, and transmits prompt information to the terminal after the application installation file is acquired to prompt the terminal.

Step 202: The server loads a basic image file of an operating system in the system container according to the image file generation request, to start the operating system.

In this embodiment, for example, the operating system is an Android operating system. When the server receives the image file generation request, an Android basic image file of the Android operating system is loaded in the Android container. In this case, the Android operating system can be started in the Android container.

Step 203: The server installs an application corresponding to the application installation file in the operating system, and runs the application to obtain a system dataset after the application is run and attribute information of the application.

For example, the application installation file is an APK file of an application A. The server runs the APK file in the Android operating system by means of a manual command or script installation, so as to install the application A to the Android operating system. The application is run in the operating system, to obtain a system dataset after the application is run and attribute information of the application. For example, the installed application is run in the Android operating system. In this case, all data in the Android container is stored to obtain the system dataset, and the attribute information of the application is acquired in the Android operating system. The attribute information may be information such as a name, a type, an installation address, a memory, and a data list of the application.

In this embodiment, before running the application to obtain the system dataset and the attribute information of the application, the server may configure the installed application. That is to say, before the step of running the application to obtain the system dataset after the application is run and the attribute information of the application, the method for generating an image file may further include: searching, by the server, the application installation file for configuration information used for configuring the application; configuring the application according to the configuration information when the configuration information exists; and running the configured application on the operating system after the configuration, to obtain a system dataset after the configured application is run and attribute information of the application. Details may be as follows:

(1) The server searches the application installation file for the configuration information used for configuring the application.

In this embodiment, the server may use a file name or a file format of data update information or preset parameter information as a search condition, and search the application installation file to determine whether the configuration information used for configuring the application exists therein.

(2) The server configures the application according to the configuration information when the configuration information exists.

In this embodiment, when the configuration information is the data update information, the server updates built-in data corresponding to the data update information in the application. For example, when the data update information is updated data, the application is searched for the built-in data corresponding to the updated data, and the built-in data is directly replaced with the updated data. A specific updating process may be triggered by manual click/tap or artificial intelligence automatic identification. When the data update information is a storage address of the updated data, the updated data may be acquired according to the storage address. Then, the application is searched for the built-in data corresponding to the updated data, and the built-in data is replaced with the updated data. In another embodiment, when the configuration information is the preset parameter information, a parameter corresponding to the preset parameter information in the application is set. For example, the preset parameter information is a preset picture frame number. A picture frame number in the application is directly set to the preset picture frame number in a frame setting of the application. In another example, when the configuration information is the data update information and the preset parameter information, the built-in data corresponding to the data update information in the application is updated, and the parameter corresponding to the preset parameter information in the updated application is set. For example, when the data update information and the preset parameter information both exist in the configuration information, it may be first determined whether the updated data is included in the data update information. If the updated data is included, the built-in data corresponding to the updated data may be directly replaced in the application, to obtain the updated application. If the data update information includes only the storage address, the updated data is first acquired according to the storage address. Then the built-in data corresponding to the updated data is replaced to obtain the updated application. The parameter corresponding to the preset parameter information is set in the updated application.

Step 204: The server traverses the system dataset according to the attribute information of the application, to obtain initial application data after the application is installed.

In this embodiment, the server acquires a global directory in the system container, and uses the global directory as a global directory of the system dataset. Directories corresponding to the attribute information, such as file directories corresponding to a name of the application are identified from the global directory according to the attribute information of the application. The directories are used as a target directory. The initial application data after the application is installed is identified from the system dataset based on the target directory, to obtain an initial application dataset. For example, candidate system data corresponding to the target directory may be identified from the system dataset, the initial application data corresponding to the application is identified in the candidate system data, and the initial application data is stored in the initial application dataset.

Step 205: The server adjusts the initial application data to obtain application data corresponding to the application.

In this embodiment, the server may mount a previous directory (for example, /home/workin) of a host to a container directory (for example, /workin) of the system container. Data corresponding to the container directory may be the initial application dataset. Therefore, data corresponding to the previous directory of the host may be a first shared dataset. In this way, the first shared dataset can share the initial application data with the initial application dataset. In this embodiment, abnormal data and configuration data may be identified in the application data according to a first preset identification condition. The abnormal data generated during the running of the application may be deleted from the first shared dataset. The abnormal data may include temporary data during the running of the application and data irrelevant to the application. For example, the temporary data required to be deleted may be related files under directories such as "/mnt/runtime/read", "/mnt/runtime/write", and "/storage/emulated". In another example, a name of a data package may be used as a search condition. For example, the name of the data package may be "com.tenxxx.tmgp.sgame". The entire configuration data is searched for target configuration data. The target configuration data may be data such as related fields in files such as "/data/system/packages.xml" and "/data/system/packages.list". The target configuration data is retained, and other configuration data is modified or deleted. The operation is mainly intended to minimize application-related data to reduce coupling with the basic image file. In this embodiment, configuration data in some applications may be further modified. For example, during generation of the image file, some icons are required to be displayed for click/tap by a user. After the generation is completed, the icons (for example, icons of applications such as QQ and WeChat) are required to be hidden. Therefore, corresponding configuration files are required to be modified to adjust states of the corresponding icons. Application data corresponding to the applications may be obtained by deleting and modifying configuration data.

Step 206: The server merges the application data with the basic image file to generate an image file of the application.

In this embodiment, the server creates a Dockerfile text. The text includes a command and an instruction required for constructing the image file. For example, a specific basic image text is designated. In this embodiment, the basic image text may be designated as a basic image file of an Android operating system, and the application data corresponding to the application is added to the Android basic image file by using a COPY or ADD command. By virtue of the file, an image file of the application having a designated name can be generated. In this process, an attribute and a permission of the file are required to remain unchanged. In this embodiment, the basic image file may be merged with the application data in other manners, to obtain the image file of the application.

In this embodiment, the image file of the application may alternatively be synthesized by using commands such as "docker run/docker cp/docker export", to obtain the image file of the application.

In this embodiment, after the image file of the application is deployed on a server where the image file is run, in case of upgrading some components of the operating system, modifying an input method, and repairing vulnerabilities during running, the basic image file is required to be updated. In this case, the image file of the application is also required to be updated. Therefore, the method for generating an image file may further include:

acquiring, by the server, an updated basic image file when the basic image file is updated; adding a read-write layer to a read-only layer of the updated basic image file; and adding the application data corresponding to the application to the read-write layer, to obtain a first updated image file of the application.

In this embodiment, when the basic image file is updated, the server acquires the updated basic image file, determines basic information of the read-write layer to be added to the basic image file according to the application data, adds the read-write layer corresponding to the basic information to the read-only layer of the updated basic image file, and adds the application data to the read-write layer according to the basic information, to obtain the first updated image file of the application.

In this embodiment, after the image file of the application is deployed on the server where the image file is run, when the application is updated, which means that the installation file of the application is also updated, the application is required to be updated. Therefore, the method for generating an image file may further include:

acquiring, by the server, an updated application installation file when the application installation file is updated; updating the application on the operating system according to the updated application installation file, and monitoring the application data corresponding to the application; extracting updated application data as updated data of the application when the application data is updated; and merging the updated data with the image file of the application to obtain a second updated image file after the application is updated.

In this embodiment, the server may directly acquire the updated application installation file. Alternatively, the server may acquire a storage address of the updated application installation file, and then acquires the updated application installation file according to the storage address. In this embodiment, the image file of the application may be loaded on the operating system of the system container. The image file loaded in the system container may be defined as a read-only layer. The system container may include one or more read-only layers, and one read-write layer is superimposed on the one or more read-only layers. The application may be updated by loading the updated application installation file on the operating system. During the updating, an image home directory of the host may be mounted to the system container as an image file directory. The image home directory of the host may include the image file of the application. During the updating of the application, data in the image file of the application is modified or altered in the read-write layer. Therefore, as long as the read-write layer of the image file of the application changes, it may be determined that the application data corresponding to the application is updated. Therefore, the monitoring of the application data corresponding to the application may be completed in the read-write layer, which may be understood as monitoring the updating of the application data corresponding to the application using the read-write layer. Alternatively, a file monitoring program may be customized in the system container for monitoring the updating of the application data.

In this embodiment, in a cast that the application data is updated, an updated dataset may be created in the system container, and a script file under an updated dataset directory may be executed. Then the updated data may be acquired merely by traversing a read-write layer directory of the image file of the application under the image file directory, and the updated data is stored in the updated dataset. In this embodiment, a second shared dataset may be constructed in an area outside the system container where the operating system is located, to cause the second shared dataset to share data content of the updated data with the updated dataset. In this embodiment, the updated data in the second shared dataset is analyzed, so that the abnormal data and the configuration data in the updated data can be identified. The abnormal data of the updated application generated during running may be deleted from the second shared dataset. The abnormal data may include some temporary data generated during the running of the application and data irrelevant to the application. The temporary data required to be deleted may be related files under directories such as "/mnt/runtime/read", "/mnt/runtime/write", and "/storage/emulated". In this embodiment, a name of a data package may be used as a search condition. For example, the name of the data package may be "com.tenxxx.tmgp.sgame". The entire configuration data is searched for target configuration data. The target configuration data may be data such as related fields in files such as "/data/system/packages.xml" and "/data/system/packages.list". The target configuration data is retained, and other configuration data is modified or deleted. In this embodiment, configuration data in some updated applications may be further modified. For example, during generation of the image file, some icons are required to be displayed for click/tap by a user. After the generation is completed, the icons (for example, icons of applications such as QQ and WeChat) are required to be hidden. Therefore, corresponding configuration files are required to be modified to adjust states of the corresponding icons. The target updated data may be obtained by deleting or modifying configuration data. The information of the read-write layer required to be added to the image file is determined according to the target updated data. The read-write layer is superimposed on the image file. Then, a target updated file is added to the read-write layer of the image file. In this way, the second updated image file after the application is updated can be obtained. A specific process of merging the target updated data with the image file of the application may be constructed by using Dockerfile. For example, a Dockerfile text is created. The text includes a command and an instruction required for constructing the second updated image file. For example, a specific basic image text is designated. In this embodiment, the basic image text may be designated as the image file of the application, and the target updated data is added to the image file of the application by using a COPY or ADD command. By virtue of the file, an image file of the application having a designated name can be generated. In this process, an attribute and a permission of the file are required to remain unchanged. In this embodiment, the image file of the application may alternatively be merged with the target updated data in other manners, to obtain the second updated image file after the application is updated.

When the application installation file is updated, it may be understood that the application is required to be updated. In order to update the application, the basic image file may be loaded to start the operating system, the updated application installation file is re-installed in the operating system, then the application data of the updated application is acquired, and the application data is merged with the basic image file to obtain the second updated image file of the application. However, in order to reduce a deployment time of the application, the updated data in the application data may be acquired, and the updated data is merged with the image file of the application to obtain the second updated image file of the application.

According to the method described in the foregoing embodiments, the following further provides detailed description for the embodiments of the present disclosure.

Figure 10:
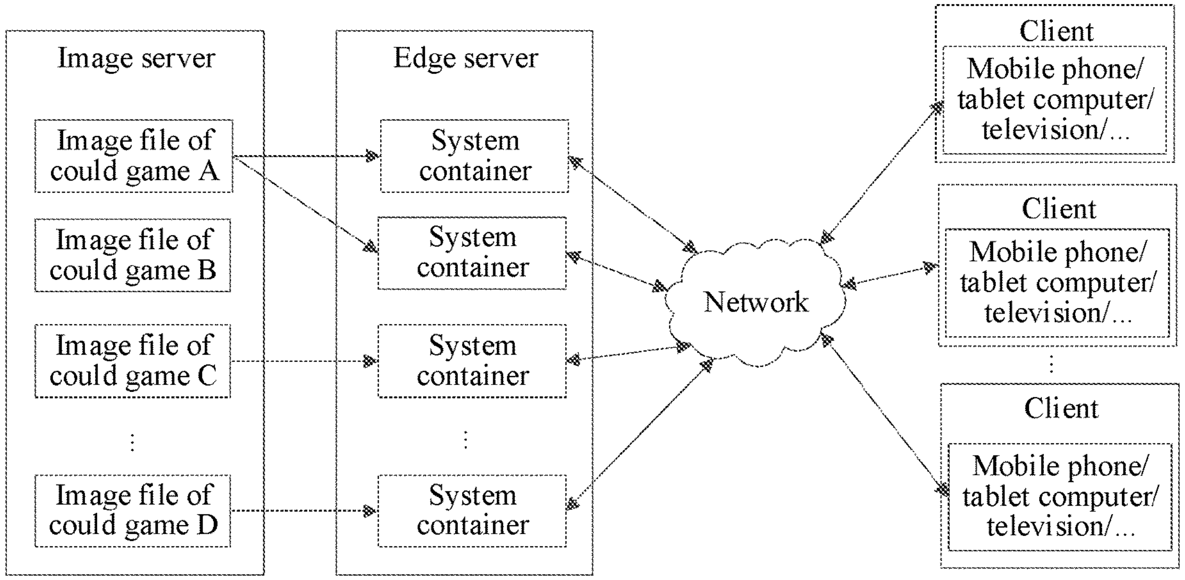
FIG. 10 is a schematic structural diagram of a cloud game system according to an embodiment of the present disclosure.

In this embodiment, for example, the method for generating an image file is applicable to a cloud game system. The cloud game system includes a mirror server, an edge server, and a user terminal. The user terminal may be a mobile phone, a tablet computer, and/or a television, as shown in FIG. 10. The apparatus for generating an image file is integrated in the mirror server. A user may access the cloud game application in the edge server by using the terminal.

Figure 11:
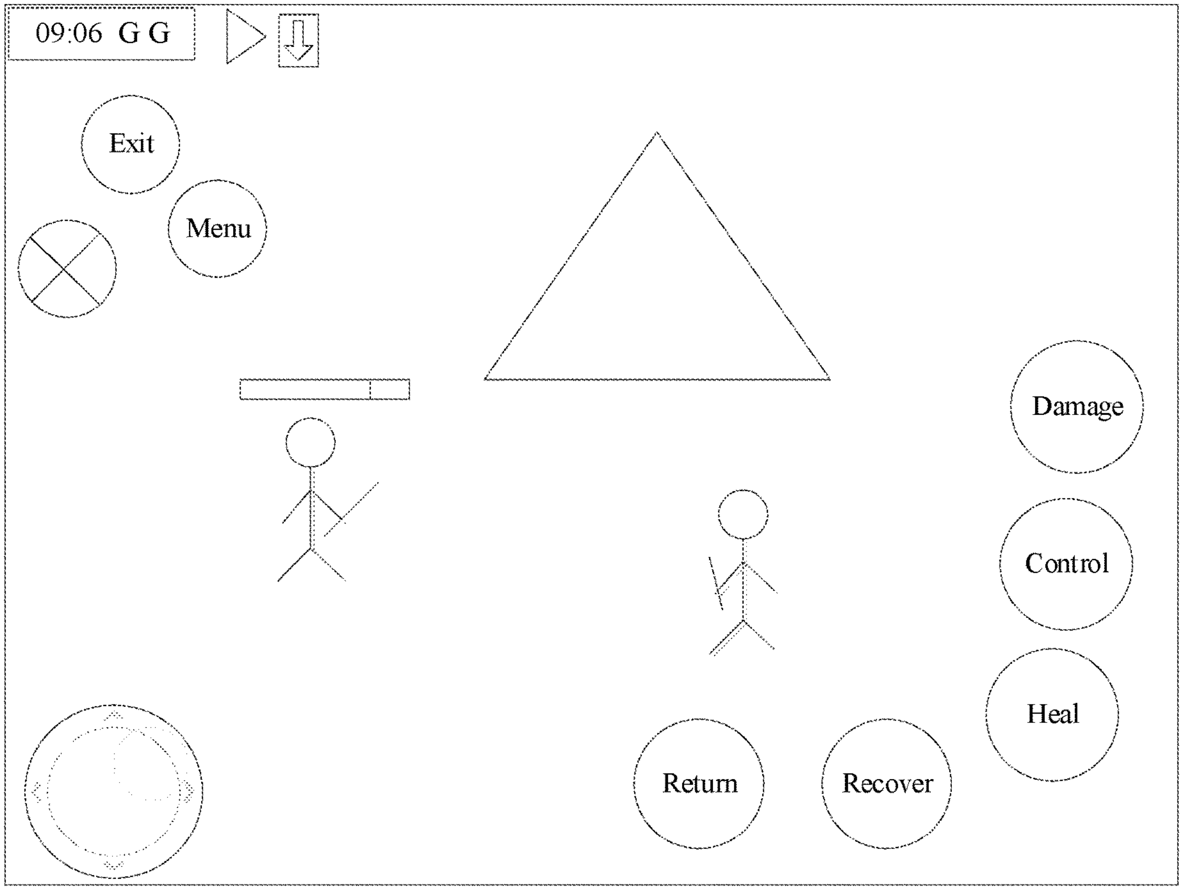
FIG. 11 is a schematic diagram of a cloud game page according to an embodiment of the present disclosure.

The mirror server receives an image file generation request carrying a cloud game installation file, then loads a basic image file of an operating system in a preset system area according to the image file generation request, to start the operating system; then installs a cloud game corresponding to the cloud game installation file in the operating system, and runs the cloud game to obtain a system dataset after the cloud game is run and attribute information of the cloud game; and identifies game data corresponding to the cloud game from the system dataset according to the attribute information of the cloud game, and merges the game data with the basic image file to generate an image file of the cloud game, that is, a cloud game image. The mirror server deploys the cloud game image to the edge server. The edge server starts a system container corresponding to the cloud game image, to deploy the cloud game image into the system container. For example, the system container may be an Android container. When a user accesses the cloud game by means of a client of the user terminal, the user terminal transmits a client connection request to the edge server. The client connection request carries a cloud game identifier. The edge server assigns, according to the cloud game identifier, a system container corresponding to the cloud game identifier to establish a connection to the client. In this case, the user terminal enters the cloud game by using the cloud game image. The client of the user terminal transmits input events (for example, a mouse event and keyboard event) to the corresponding system container by using a data stream. The system container is responsible for capturing a corresponding cache area image and transmitting the cache area image to the client. For example, the system container is the Android container. The client of the user terminal transmits the input events such as the mouse event and keyboard event to the corresponding Android container by using the data stream. The Android container is responsible for capturing the corresponding cache area image and transmitting the cache area image to the client. In this way, the client can display a feedback image of the user in the cloud game corresponding to the input events, as shown in FIG. 11. When the basic image file of the cloud game is updated, only the updated basic image file is required to be merged with the game data of the cloud game, to obtain a first updated image file of the cloud game, and then the first updated image file is redeployed into the corresponding system container in the edge server. When the cloud game is updated during the running, that is, an installation file of the cloud game is updated, only updated data of the cloud game is required to be acquired, and the updated data is merged with the image file of the cloud game, to obtain a second updated image file of the cloud game. Then the second updated image file is redeployed into the corresponding system container in the edge server. When the user terminal transmits the client connection request, the edge server assigns a system container corresponding to the updated image file of the cloud game to connect to the client, so that the user terminal can perform operations on the cloud game by using the client. In this way, steps of updating the game can be simplified.

In order to implement the above method more effectively, an embodiment of the present disclosure further provides an apparatus for generating an image file. The apparatus for generating an image file may be integrated in an electronic device, such as a server or a terminal. The terminal may include a tablet computer, a notebook computer, and/or a personal computer.

Figure 12:
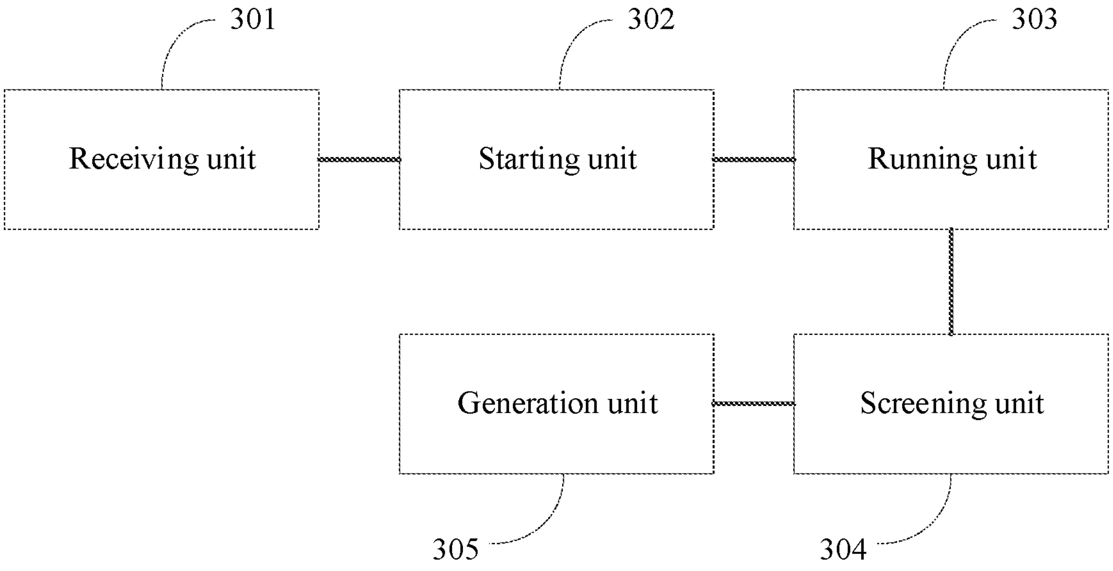
FIG. 12 is a schematic structural diagram of an apparatus for generating an image file according to an embodiment of the present disclosure.

For example, as shown in FIG. 12, the apparatus for generating an image file may include a receiving unit 301, a starting unit 302, a running unit 303, a screening unit 304, and a generation unit 305. Details are described as follows.

(1) Receiving Unit 301

The receiving unit 301 is configured to receive an image file generation request, the image file generation request carrying an application installation file.

In this embodiment, the receiving unit 301 may be specifically configured to receive the image file generation request, and extract the application installation file from the image file generation request. When the application installation file requires a relatively large memory or there are a plurality of application installation files, the application installation file(s) may be acquired indirectly.

(2) Starting Unit 302

The starting unit 302 is configured to load a basic image file of an operating system in a preset system area according to the image file generation request, to start the operating system.

In this embodiment, the starting unit 302 may be specifically configured to load the basic image file of the operating system in a system container according to the image file generation request, to start the operating system in the system container.

(3) Running Unit 303

The running unit 303 is configured to install an application corresponding to the application installation file in the operating system, and run the application to obtain a system dataset after the application is run and attribute information of the application.

In this embodiment, the running unit 303 may be specifically configured to: load the application installation file in the operating system, install the application corresponding to the application installation file in the operating system, and run the application in the operating system to obtain the system dataset after the application is run and the attribute information of the application.

In this embodiment, the running unit 303 may be specifically configured to: search the application installation file for configuration information used for configuring the application; and configure the application according to the configuration information when the configuration information exists. The running the application to obtain a system dataset after the application is run and attribute information of the application includes: running the configured application on the operating system, to obtain a system dataset after the configured application is run and attribute information of the application.

In this embodiment, the running unit 303 may be specifically configured to: update built-in data corresponding to the data update information in the application when the configuration information is the data update information; set a parameter corresponding to the preset parameter information in the application when the configuration information is the preset parameter information; and update the built-in data corresponding to the data update information in the application and set the parameter corresponding to the preset parameter information in the updated application, when the configuration information is the data update information and the preset parameter information.

(4) Screening Unit 304

The screening unit 304 is configured to identify application data corresponding to the application from the system dataset according to the attribute information of the application.

In this embodiment, the screening unit 304 may be specifically configured to: traverse the system dataset according to the attribute information of the application, to obtain initial application data after the application is installed, and adjust the initial application data to obtain the application data corresponding to the application.

In this embodiment, the screening unit 304 may be specifically configured to acquire a global directory of the system dataset; identify a target directory from the global directory according to the attribute information of the application; and identify, based on the target directory, the initial application data after the application is installed data from the system dataset, to obtain an initial application dataset.

In this embodiment, the screening unit 304 may be specifically configured to: construct a first shared dataset in an area outside the operating system, to cause the first shared dataset to share the initial application data with the initial application dataset; and adjust the application data in the first shared dataset, to obtain the application data corresponding to the application.

In this embodiment, the screening unit 304 may be specifically configured to: identify abnormal data and configuration data in the application data according to a first preset identification condition; and delete, from the first shared dataset, the abnormal data in the initial application dataset, and modify the configuration data in the initial application dataset, to obtain the application data corresponding to the application.

(5) Generation Unit 305

The generation unit 305 is configured to merge the application data with the basic image file, to generate an image file of the application.

In this embodiment, the generation unit 305 may be specifically configured to: determine, according to the application data, basic information of read-write layer to be added to the basic image file, add the read-write layer corresponding to the basic information to the read-only layer of the basic image file, and add the application data to the read-write layer according to the basic information, to obtain the image file of the application.

In this embodiment, the generation unit 305 may be specifically configured to: acquire the attribute information of the application data; identify, from the read-write layers according to the basic information of the read-write layer, a read-write layer matching the attribute information of the application data as a target read-write layer; and add the application data to the target read-write layer, and use the basic image file to which the application data is added as the image file of the application.

Figure 13:
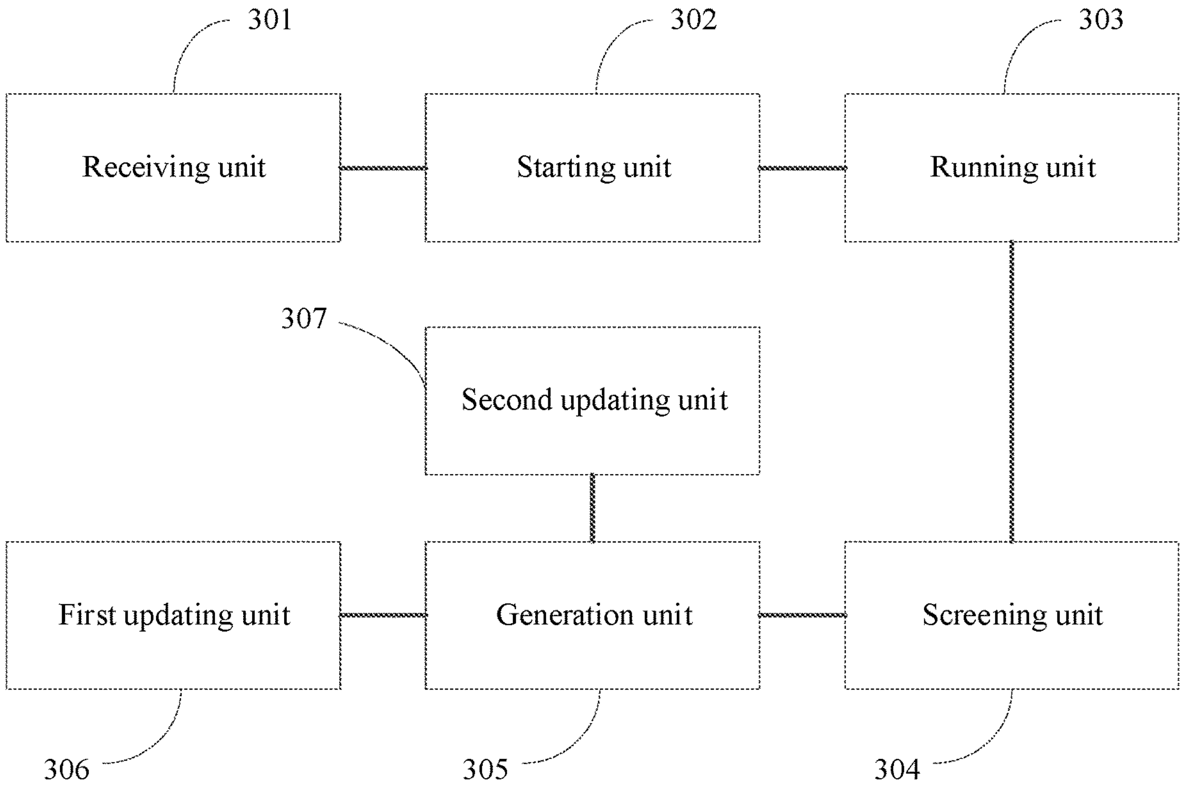
FIG. 13 is another schematic structural diagram of an apparatus for generating an image file according to an embodiment of the present disclosure.

In this embodiment, the apparatus for generating an image file may further include a first updating unit 306 and/or a second updating unit 307, as shown in FIG. 13.

In this embodiment, the first updating unit 306 may be specifically configured to: acquire an updated basic image file when the basic image file is updated; add a read-write layer to a read-only layer of the updated basic image file; and add the application data corresponding to the application to the read-write layer, to obtain a first updated image file of the application.

In some embodiments, the second updating unit 307 may be specifically configured to: acquire an updated application installation file when the application installation file is updated; update the application on the operating system according to the updated application installation file, and monitor the application data corresponding to the application; extract updated application data as updated data of the application when the application data is updated; and merge the updated data with the image file of the application to obtain a second updated image file after the application is updated.

In this embodiment, the second updating unit 307 may be specifically configured to: load the image file of the application on the operating system, and add a read-write layer to the image file of the application; and update the application on the operating system according to the updated application installation file, and monitor, by using the read-write layer, the application data corresponding to the application during the updating of the application.

In this embodiment, the second updating unit 307 may be specifically configured to: construct a second shared dataset in an area outside the operating system, to cause the second shared dataset to share data content with the updated data; identify in the second shared dataset, abnormal data and configuration data in the updated data according to a second preset identification condition; delete, from the second shared dataset, the abnormal data in the updated data, and modify the configuration data in the updated data, to obtain target updated data; and merge target updated data with the image file of the application to obtain the second updated image file after the application is updated.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

During specific implementation, the above units may be implemented as independent entities, or may be combined arbitrarily. When implementing as the same entity or several entities. For specific implementation of the foregoing units, refer to the foregoing method embodiments. Details are not described herein again.

Figure 14:
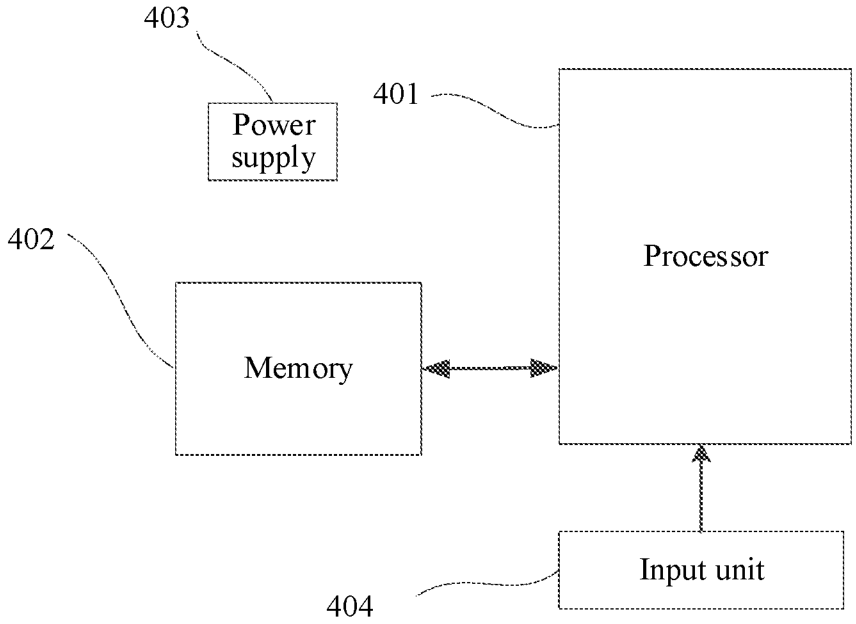
FIG. 14 is a schematic structural diagram of an electronic device according to an embodiment of the present disclosure.

This embodiment of the present disclosure further provides an electronic device. FIG. 14 is a schematic structural diagram of an electronic device according to an embodiment of the present disclosure.

The electronic device may include components such as a processor 401 with one or more processing cores, a memory 402 with one or more computer-readable storage media, a power supply 403, and an input unit 404. A person skilled in the art may understand that the electronic device structure shown in FIG. 14 does not constitute a limitation to the electronic device. In another embodiment, the electronic device may include more or fewer components than those shown in the figure, may combine some components, or may have different component arrangements.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. In an embodiment, the processor 401 may include one or more processing cores. In another embodiment, the processor 401 may integrate an application processor and a modem processor. The application processor mainly processes an operating system, a user interface, an application, and the like. The modem mainly processes wireless communication. It may be understood that the foregoing modem may either not be integrated into the processor 401.

The memory 402 may be configured to store the software programs and modules. The processor 401 runs the software programs and modules stored in the memory 402, to perform various function application and data processing. The memory 402 may mainly include a program storage area and a data storage area. The program storage area may store an operating system, an application program required by at least one function (for example, a sound playback function and an image display function), and the like. The data storage area may store data created according to use of the electronic device. In addition, the memory 402 may include a high speed random access memory, and may further include a non-volatile memory, such as at least one magnetic disk storage device, a flash memory, or another volatile solid-state storage device. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The electronic device further includes the power supply 403 for supplying power to the components. The power supply 403 may logically connect to the processor 401 by using a power supply management system, thereby implementing functions, such as charging, discharging, and power consumption management, by using the power supply management system. The power supply 403 may further include one or more of a direct current or alternating current power supply, a re-charging system, a power failure detection circuit, a power supply converter or inverter, a power supply state indicator, and any other components.

The electronic device may further include the input unit 404. The input unit 404 may be configured to receive inputted numeric or character information and generate keyboard, mouse, joystick, optical, or trackball signal input related to user settings and function control.

Although not shown in the figure, the electronic device may further include a display unit, and the like. Details are not described herein again. In this embodiment, the processor 401 in the electronic device loads executable files corresponding to processes of one or more applications to the memory 402 according to the following instructions, and runs the applications stored in the memory 402, to implement the various functions of the apparatus for generating an image file provided in the embodiments of the present disclosure and the steps in the method for generating an image file provided in the embodiments of the present disclosure.

In this embodiment of the present disclosure, an image file generation request carrying an application installation file is received, then a basic image file of an operating system is loaded in a preset system area according to the image file generation request, to start the operating system, then an application corresponding to the application installation file is installed in the operating system, and the application is run to obtain a system dataset after the application is run and attribute information of the application, application data corresponding to the application is identified from the system dataset according to the attribute information of the application, and the application data and the basic image file are merged to generate an image file of the application. In this solution, the application is installed and run on the operating system to obtain the system dataset, the application data corresponding to the application is identified from the system dataset, and the application data is merged with the basic image file to generate the image file of the application. Therefore, a memory required for the image file of the application is greatly reduced, thereby saving storage resources. In addition, since the image file of the application generated in this embodiment of the present disclosure does not include data irrelevant to the application or temporary data, processing resources of a device where the application is deployed can be saved, and a deployment time of the application can be greatly reduced.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

For this purpose, an embodiment of the present disclosure further provides a computer-readable storage medium storing a plurality of instructions. The instructions can be loaded by a processor to perform the steps in any of the methods for generating an image file provided in the embodiments of the present disclosure.

The computer-readable storage medium may include: a read-only memory (ROM), a random access memory (RAM), a magnetic disk, an optical disc or the like.

Since the instructions stored in the computer-readable storage medium can be used to perform the steps in any of the methods for generating an image file provided in the embodiments of the present disclosure, the instructions can achieve the beneficial effects that can be achieved by any of the methods for generating an image file provided in the embodiments of the present disclosure.

The method and apparatus for generating an image file and the computer-readable storage medium are described above in detail. Principles and implementations of the present disclosure are illustrated by using specific examples. The description of the above embodiments is merely used for facilitating understanding of the core idea of the present disclosure. Meanwhile, a person skilled in the art may make modifications to the specific implementations and application scopes according to the ideas of the present disclosure. In conclusion, the content of the specification should not be construed as a limitation to the present disclosure.

What is claimed is:

1. A method for generating an image file, comprising:

receiving an image file generation request that carries an application installation file;

loading a basic image file of an operating system in a preset system area according to the image file generation request, to start the operating system;

installing an application corresponding to the application installation file in the operating system, and running the application to obtain a system dataset after the application is run and attribute information of the application;

identifying application data corresponding to the application from the system dataset according to the attribute information of the application;

merging the application data with the basic image file to generate the image file of the application;

acquiring an updated basic image file when the basic image file is updated;

adding a read-write layer to a read-only layer of the updated basic image file; and adding the application data corresponding to the application to the read-write layer, to obtain a first updated image file of the application.

2. The method according to claim 1, wherein the method is implemented on a host server, the image file of the application is generated on the host server and is configured to be loaded and run by a container of the operating system.

3. The method according to claim 1, wherein the basic image file comprises a read-only layer, and the merging the application data with the basic image file to generate an image file of the application comprises:

determining, according to the application data, basic information of a read-write layer required to be added to the basic image file;

adding the read-write layer corresponding to the basic information to the read-only layer of the basic image file; and adding the application data to the read-write layer according to the basic information, to obtain the image file of the application.

4. The method according to claim 1, wherein the identifying application data corresponding to the application from the system dataset according to the attribute information of the application comprises:

traversing the system dataset according to the attribute information of the application, to obtain initial application data after the application is installed; and adjusting the initial application data to obtain the application data corresponding to the application.

5. The method according to claim 4, wherein the traversing the system dataset according to the attribute information of the application, to obtain initial application data after the application is installed comprises:

acquiring a global directory of the system dataset;

identifying a target directory from the global directory according to the attribute information of the application; and identifying, based on the target directory, the initial application data from the system dataset after the application is installed, to obtain an initial application dataset.

6. The method according to claim 5, wherein the adjusting the initial application data to obtain the application data corresponding to the application comprises:

constructing a first shared dataset in an area outside the operating system, the initial application data is shared between the first shared dataset and the initial application dataset; and adjusting the application data in the first shared dataset, to obtain the application data corresponding to the application.

7. The method according to claim 6, wherein the adjusting the application data in the first shared dataset, to obtain the application data corresponding to the application comprises:

identifying abnormal data and configuration data in the application data according to a first preset identification condition; and deleting, from the first shared dataset, the abnormal data in the initial application dataset, and modifying the configuration data in the initial application dataset, to obtain the application data corresponding to the application.

8. The method according to claim 1, wherein before the running the application to obtain a system dataset after the application is run and attribute information of the application, the method further comprises:

searching the application installation file for configuration information used for configuring the application;

configuring the application according to the configuration information when the configuration information exists; and the running the application to obtain a system dataset after the application is run and attribute information of the application comprises: running the configured application on the operating system to obtain a system dataset after the configured application is run and attribute information of the application.

9. The method according to claim 8, wherein the configuration information comprises at least one of data update information or preset parameter information, and the configuring the application according to the configuration information when the configuration information exists comprises:

updating built-in data corresponding to the data update information in the application when the configuration information includes the data update information;

setting a parameter corresponding to the preset parameter information in the application when the configuration information includes the preset parameter information; and updating the built-in data corresponding to the data update information in the application and setting the parameter corresponding to the preset parameter information in the updated application, when the configuration information includes both the data update information and the preset parameter information.

10. The method according to claim 2, further comprising:

acquiring an updated application installation file when the application installation file is updated;

updating the application on the container of the operating system according to the updated application installation file, and monitoring the application data corresponding to the application, wherein updated application data is extracted from the container as updated data of the application when the application data is updated; and merging, by the host server, the updated data from the container with the image file of the application to obtain a second updated image file after the application is updated.

11. The method according to claim 10, wherein the updating the application on the operating system according to the updated application installation file, and monitoring the application data corresponding to the application comprises:

loading the image file of the application on the operating system, and adding a read-write layer to the image file of the application; and updating the application on the operating system according to the updated application installation file, and monitoring, by using the read-write layer, the application data corresponding to the application during the updating of the application.

12. The method according to claim 11, wherein the merging the updated data with the image file of the application to obtain a second updated image file after the application is updated comprises:

constructing a second shared dataset in an area outside the operating system, data content of the updated data being shared with the second shared dataset;

identifying, in the second shared dataset, abnormal data and configuration data in the updated data according to a second preset identification condition;

deleting, from the second shared dataset, the abnormal data in the updated data, and modifying the configuration data in the updated data, to obtain target updated data; and merging the target updated data with the image file of the application to obtain the second updated image file after the application is updated.

13. An apparatus for generating an image file, comprising a processor and a memory, the memory storing a plurality of program instructions, and the processor being configured to run the program instructions in the memory to perform:

receiving an image file generation request, the image file generation request carrying an application installation file;

loading a basic image file of an operating system in a preset system area according to the image file generation request, to start the operating system;

installing an application corresponding to the application installation file in the operating system, and running the application to obtain a system dataset after the application is run and attribute information of the application;

identifying application data corresponding to the application from the system dataset according to the attribute information of the application;

merging the application data with the basic image file to generate the image file of the application;

acquiring an updated basic image file when the basic image file is updated;

adding a read-write layer to a read-only layer of the updated basic image file; and adding the application data corresponding to the application to the read-write layer, to obtain a first updated image file of the application.

14. The apparatus according to claim 13, wherein the identifying application data corresponding to the application from the system dataset according to the attribute information of the application comprises:

traversing the system dataset according to the attribute information of the application, to obtain initial application data after the application is installed; and adjusting the initial application data to obtain the application data corresponding to the application.

15. The apparatus according to claim 14, wherein the traversing the system dataset according to the attribute information of the application, to obtain initial application data after the application is installed comprises:

acquiring a global directory of the system dataset;

identifying a target directory from the global directory according to the attribute information of the application; and identifying, based on the target directory, the initial application data from the system dataset after the application is installed, to obtain an initial application dataset.

16. The apparatus according to claim 15, wherein the adjusting the initial application data to obtain the application data corresponding to the application comprises:

constructing a first shared dataset in an area outside the operating system, the initial application data is shared between the first shared dataset and the initial application dataset; and adjusting the application data in the first shared dataset, to obtain the application data corresponding to the application.

17. The apparatus according to claim 16, wherein the adjusting the application data in the first shared dataset, to obtain the application data corresponding to the application comprises:

identifying abnormal data and configuration data in the application data according to a first preset identification condition; and deleting, from the first shared dataset, the abnormal data in the initial application dataset, and modifying the configuration data in the initial application dataset, to obtain the application data corresponding to the application.

18. The apparatus according to claim 13, wherein before the running the application to obtain a system dataset after the application is run and attribute information of the application, the method further comprises:

searching the application installation file for configuration information used for configuring the application;

configuring the application according to the configuration information when the configuration information exists; and the running the application to obtain a system dataset after the application is run and attribute information of the application comprises: running the configured application on the operating system to obtain a system dataset after the configured application is run and attribute information of the application.

19. The apparatus according to claim 13, wherein the configuration information comprises at least one of data update information or preset parameter information, and the configuring the application according to the configuration information when the configuration information exists comprises:

updating built-in data corresponding to the data update information in the application when the configuration information includes the data update information;

setting a parameter corresponding to the preset parameter information in the application when the configuration information includes the preset parameter information; and updating the built-in data corresponding to the data update information in the application and setting the parameter corresponding to the preset parameter information in the updated application, when the configuration information includes both the data update information and the preset parameter information.

20. A non-transitory computer-readable storage medium, storing a plurality of instructions, the instructions being adapted to be loaded by a processor to perform:

receiving an image file generation request, the image file generation request carrying an application installation file;

loading a basic image file of an operating system in a preset system area according to the image file generation request, to start the operating system;

installing an application corresponding to the application installation file in the operating system, and running the application to obtain a system dataset after the application is run and attribute information of the application;

identifying application data corresponding to the application from the system dataset according to the attribute information of the application;

merging the application data with the basic image file to generate an image file of the application;

acquiring an updated basic image file when the basic image file is updated;

adding a read-write layer to a read-only layer of the updated basic image file; and adding the application data corresponding to the application to the read-write layer, to obtain a first updated image file of the application.

* * * * *